United States Patent
Chapman et al.

(10) Patent No.: US 9,396,592 B2
(45) Date of Patent: Jul. 19, 2016

(54) MAINTENANCE SYSTEMS AND METHODS FOR USE IN ANALYZING MAINTENANCE DATA

(71) Applicant: The Boeing Company, Seal Beach, CA (US)

(72) Inventors: Steven David Chapman, O'Fallon, MO (US); Peter J. Lake, Auburn, WA (US); Jay Kevin McCullough, Belleville, IL (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 13/959,425

(22) Filed: Aug. 5, 2013

(65) Prior Publication Data
US 2015/0039177 A1   Feb. 5, 2015

(51) Int. Cl.
C07C 5/00 (2006.01)
G07C 5/08 (2006.01)
G07C 5/00 (2006.01)

(52) U.S. Cl.
CPC .............. G07C 5/0808 (2013.01); G07C 5/008 (2013.01); *G07C 5/085* (2013.01)

(58) Field of Classification Search
CPC .............. G06F 11/079; G06F 11/0793; G06F 11/2257; G07C 5/0808; G07C 5/0816; G07C 5/0841; G07C 5/085
See application file for complete search history.

(56) References Cited

U.S. PATENT DOCUMENTS

| | | | |
|---|---|---|---|
| 5,491,631 A | 2/1996 | Shirane et al. | |
| 5,592,614 A | 1/1997 | Peters | |
| 6,003,808 A | 12/1999 | Nguyen et al. | |
| 6,259,977 B1 | 7/2001 | Mayer et al. | |
| 6,324,659 B1 | 11/2001 | Pierro | |
| 6,343,236 B1 * | 1/2002 | Gibson | B61C 17/04 700/110 |
| 7,230,527 B2 | 6/2007 | Basu et al. | |
| 7,239,946 B2 | 7/2007 | Sowa | |
| 7,502,718 B2 | 3/2009 | Kanamaru | |
| 8,306,689 B2 | 11/2012 | Koepping et al. | |
| 8,335,601 B2 | 12/2012 | Sham et al. | |
| 8,356,207 B2 | 1/2013 | Hosek et al. | |
| 8,825,276 B2 * | 9/2014 | Lake | G07C 5/0808 701/31.6 |
| 2008/0249678 A1 | 10/2008 | Bailly et al. | |

* cited by examiner

*Primary Examiner* — Bryce Bonzo
*Assistant Examiner* — Anthony J Amoroso
(74) *Attorney, Agent, or Firm* — Armstrong Teasdale LLP

(57) ABSTRACT

Methods and maintenance systems for use in analyzing data related to maintenance of at least one vehicle are disclosed. One example method includes retrieving, by a computing device, a plurality of diagnostic entries associated with at least one fault message from a database of diagnostic entries, each diagnostic entry including an identified corrective action and a date on which the identified corrective action was taken; identifying a plurality of groups of diagnostic entries, wherein the diagnostic entries in a group have a same corrective action, and each group has a confidence level associated with its corrective action; and weighting the confidence level for each group based on an age of the plurality of diagnostic entries in the group.

20 Claims, 3 Drawing Sheets

MAINTENANCE SYSTEMS AND METHODS FOR USE IN ANALYZING MAINTENANCE DATA

BACKGROUND

The field of the disclosure relates generally to maintenance systems and methods and, more particularly, to analyzing data related to maintenance of at least one vehicle.

Various types of vehicles are known to include monitoring technologies, which enable vehicles to detect abnormal conditions and report the abnormal conditions as fault messages associated with one or more components of the vehicle. Aircraft, for example, often include systems to monitor components of the aircraft during flight and report fault messages when abnormal conditions are identified. Fault messages may be reported to an operator of the aircraft and/or to another system or individual to ensure appropriate maintenance is pursued to address the abnormal conditions underlying the fault messages. Additionally, yet separately, during maintenance of a vehicle, reports are often generated, which indicate action codes and/or text descriptions of the repair and/or other maintenance procedures performed by the maintenance personnel on the vehicle.

BRIEF DESCRIPTION

In one aspect, a method for use in analyzing data related to maintenance of at least one vehicle is described. The method includes retrieving, by a computing device, a plurality of diagnostic entries associated with at least one fault message from a database of diagnostic entries. Each diagnostic entry includes an identified corrective action and a date on which the identified corrective action was taken. The method includes identifying a plurality of groups of diagnostic entries. All diagnostic entries in a group have a same corrective action. The method includes weighting a confidence level associated with the corrective action for at least one group based on an age of the plurality of diagnostic entries in the group.

In another aspect, a maintenance system for use in analyzing data related to maintenance of at least one vehicle includes a memory device storing a plurality of diagnostic entries, and a processor coupled to the memory device. Each diagnostic entry includes at least one fault message, an identified corrective action, and a date. The processor is configured to identify a plurality of groups of diagnostic entries from the plurality of diagnostic entries, and determine a plurality of weighting factors for the groups based on an age of the plurality of diagnostic entries in the groups. All diagnostic entries in a group have a same corrective action.

In yet another aspect, one or more non-transitory computer-readable storage media having computer-executable instructions embodied thereon are described. When executed by at least one processor, the computer-executable instructions cause the processor to identify a plurality of groups of diagnostic entries from a plurality of diagnostic entries. Each diagnostic entry includes at least one fault message, an identified corrective action, and a date, and all diagnostic entries in a group have a same corrective action. The computer-executable instructions cause the processor to determine a weighting factor for each group based on an age of the plurality of diagnostic entries in the group.

The features, functions, and advantages that have been discussed can be achieved independently in various embodiments or may be combined in yet other embodiments further details of which can be seen with reference to the following description and drawings.

DETAILED DESCRIPTION

The subject matter described herein relates to analyzing data related to maintenance of a vehicle to provide a diagnostic entry, which includes a fault message and a corrective action associated with the fault message.

In one embodiment, technical effects of the methods, systems, and computer-readable media described herein include at least one of: (a) identifying a plurality of groups of diagnostic entries from a plurality of diagnostic entries, and (b) determining a weighting factor for each group based on an age of the plurality of diagnostic entries in the group.

As used herein, an element or step recited in the singular and proceeded with the word "a" or "an" should be understood as not excluding plural elements or steps unless such exclusion is explicitly recited. Furthermore, references to "one implementation" of the present invention or the "exemplary implementation" are not intended to be interpreted as excluding the existence of additional implementations that also incorporate the recited features.

Figure 1:
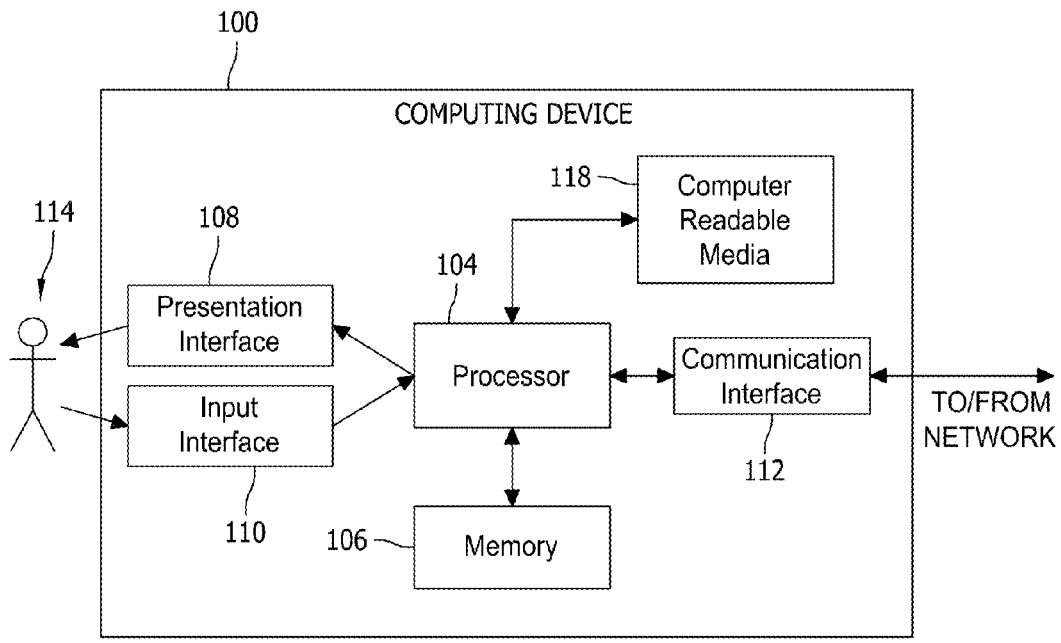
FIG. 1 is a block diagram of an exemplary computing device.

FIG. 1 is a block diagram of an exemplary computing device 100 that may be used to automatically generate a production operating system. In the exemplary implementation, computing device 100 includes a memory 106 and a processor 104 that is coupled to memory 106 for executing programmed instructions. Processor 104 may include one or more processing units (e.g., in a multi-core configuration). Computing device 100 is programmable to perform one or more operations described herein by programming memory 106 and/or processor 104. For example, processor 104 may be programmed by encoding an operation as one or more executable instructions and providing the executable instructions in memory device 106.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 104, cause processor 104 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, maintenance event log, diagnostic entries, fault messages, and/or any other type of data suitable for use with the methods and systems described herein.

In the exemplary implementation, computing device 100 includes a presentation interface 108 that is coupled to processor 104. Presentation interface 108 outputs (e.g., display, print, and/or otherwise output) information such as, but not limited to, installation data, configuration data, test data, error messages, and/or any other type of data to a user 114. For example, presentation interface 108 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some implementations, presentation interface 108 includes more than one display device. In addition, or in the alternative, presentation interface 108 may include a printer.

In the exemplary implementation, computing device 100 includes an input interface 110 that receives input from user 114. For example, input interface 110 may be configured to receive selections, requests, credentials, and/or any other type of inputs from user 114 suitable for use with the methods and systems described herein. In the exemplary implementation, input interface 110 is coupled to processor 104 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 108 and as input interface 110.

In the exemplary implementation, computing device 100 includes a communication interface 112 coupled to memory 106 and/or processor 104. Communication interface 112 is coupled in communication with a remote device, such as another computing device 100. For example, communication interface 112 may include, without limitation, a wired network adapter, a wireless network adapter, and/or a mobile telecommunications adapter.

Instructions for operating systems and applications are located in a functional form on non-transitory memory 106 for execution by processor 104 to perform one or more of the processes described herein. These instructions in the different implementations may be embodied on different physical or tangible computer-readable media, such as memory 106 or another memory, such as a computer-readable media 118, which may include, without limitation, a flash drive, CD-ROM, thumb drive, floppy disk, etc. Further, instructions are located in a functional form on non-transitory computer-readable media 118, which may include, without limitation, a flash drive, CD-ROM, thumb drive, floppy disk, etc. Computer-readable media 118 is selectively insertable and/or removable from computing device 100 to permit access and/or execution by processor 104. In one example, computer-readable media 118 includes an optical or magnetic disc that is inserted or placed into a CD/DVD drive or other device associated with memory 106 and/or processor 104. In some instances, computer-readable media 118 may not be removable.

Figure 2:
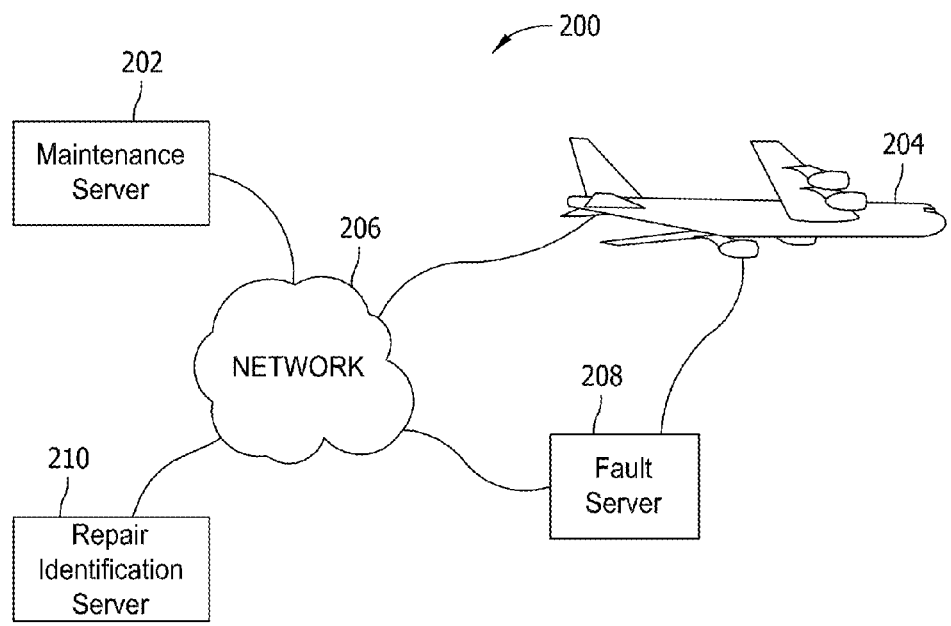
FIG. 2 is a block diagram of an exemplary maintenance system.

FIG. 2 illustrates an exemplary maintenance system 200, which includes a maintenance server 202 and a vehicle 204. While vehicle 204 is illustrated and referred to herein as an aircraft, it should be appreciated that other types of vehicles may be included in the other maintenance system implementations. As shown, maintenance server 202 is coupled to aircraft 204 through a network 206. Network 206 may include, without limitation, the Internet, an intranet, a local area network (LAN), a wide area network (WAN), a mobile network, a virtual network, and/or another suitable network for communicating data between maintenance server 202, aircraft 204, and/or other computing devices. In use, aircraft 204 transmits one or more maintenance related messages, such as, for example, fault messages, to maintenance server 202 through network 206. In turn, maintenance server 202 receives the one or more maintenance related messages from aircraft 204.

Additionally, or alternatively, maintenance system 200 includes a fault server 208 coupled to maintenance server 202 through network 206. As shown in FIG. 2, fault server 208 may be coupled directly to aircraft 204 and/or coupled to aircraft 204 through network 206. Fault server 208 is configured to receive at least fault messages from aircraft 204 and transmit such messages to maintenance server 202. Fault server 208 may be configured to provide messages between maintenance server 202 and aircraft 204 for a variety of reasons, including for example, when maintenance server 202 has limited or no direct communication with aircraft 204.

Maintenance system 200 includes a repair identification server 210 coupled to maintenance server 202 and fault server 208 through network 206. Repair identification server 210 correlates fault message from server 208 with one or more appropriate maintenance event logs from server 210. Repair identification server 210 also provides suggested corrective actions for fault messages based on the correlated fault messages and maintenance event logs.

In the exemplary implementation, maintenance server 202, fault servers 208, and repair identification server 210 are examples of computing devices 100. It should be understood that, in various implementations, each of maintenance server 202, fault servers 208, and repair identification server 210 may include multiple computing devices 100. In one example, maintenance server 202 includes a first computing device 100 located proximate at a maintenance site for use by maintenance personnel and a second computing device 100 located remote from the maintenance site for use by a data analyzer. In at least one example, maintenance server 202, fault servers 208, and repair identification server 210 each include a single computing device 100.

In the exemplary implementation, during operation, one or more fault messages are generated by aircraft 204. Fault messages may include any message generated indicating a failure, an error, a malfunction, or other abnormal condition of a component, a system, and/or operation of aircraft 204. In one example, aircraft 204 generated a fault message, indicating a bleed fan error associated with a modulation valve. In the exemplary implementation, the fault message is transmitted from aircraft 204 to fault server 208 through network 206. In turn, fault server 208 receives the fault message and stores the fault message in memory device 106. The fault message may be transmitted from aircraft 204 to fault server 208, while aircraft 204 is in-flight or when aircraft 204 is grounded. Fault server 208 subsequently transmits the fault message to maintenance server 202, which receives the fault messages and stores the fault message in memory 106. Alternatively, in other implementations, aircraft 204 transmits the fault message directly to maintenance server 202, which receives the fault messages and stores the fault message in memory 106.

In response to a fault message, aircraft 204 may be subjected to one or more maintenance sessions. Depending on the type and/or the severity of the fault message, the maintenance session may be scheduled immediately or at a convenient time. During a maintenance session, maintenance is performed on aircraft 204 to identify and/or remedy a cause of the fault message. In various examples, one or more components may be subjected to a corrective action, such as, without limitation, removing, replacing, swapping, repairing, checking, and/or deferring, etc. User 114 associated with maintenance of aircraft 204 generates maintenance event logs, which are received by maintenance server 202 from user 114 and stored in maintenance server 202. Maintenance event log may include one or more maintenance events, which may include, without limitation, individual, single, or multiple corrective actions, part numbers, part names, test results, check results, and/or descriptions, etc.

It should be appreciated that aircraft 204 may be subjected to multiple maintenance sessions in response to one or more fault messages. Accordingly, maintenance event logs may include multiple maintenance events associated with one or more fault messages.

Repair identification server 210 correlates each fault message to one or more appropriate maintenance event logs. In the exemplary implementation, processor 104 correlates the fault message and the maintenance event log, potentially based on identification of aircraft 204, location of the aircraft 204, date/time data included in the fault messages and the maintenance event log, and/or descriptions included the fault messages and the maintenance event log. Repair identification server 210 analyzes the maintenance event logs to identify the corrective actions taken during the maintenance event in response to the correlated fault message. A confidence factor is calculated for each corrective action identified. The confidence factor represents the likelihood that the corrective action that the repair identification server 210 identified in the maintenance log and associated with a fault message is the actual corrective action that was performed in response to the fault message.

The data collected by maintenance system 200 may be used to identify suggested corrective actions for fault messages. Thus, for example, the system 200 (and more particularly repair identification server 210) may retrieve the corrective action(s) identified in one or more maintenance events associated with a particular fault message and display the corrective actions to a user. Generally, the system 200 bases the suggested corrective action(s) on the number of times the particular corrective action has been taken in response to a particular fault message, and the confidence factor. Generally, corrective actions that have been taken more times are more likely to be correct. Corrective actions with higher confidence factors are more likely to be the correct action to take in response to a fault message. Additionally, more recent maintenance events generally reflect the most recent corrective action taken to address the associated fault message. Other, older, corrective actions, identified in other maintenance events, may be less instructive due to changes and modifications in aircraft systems, component changes/upgrades/redesigns, etc. Thus, processor 104 identifies suggested corrective actions based at least in part on the age of the maintenance event associated with the corrective action.

In the exemplary implementation, maintenance system 200 (and particularly repair identification server 210) searches for and retrieves all maintenance events associated with a particular fault message and weights the data by age. More recent maintenance events (and their associated corrective actions) are given more weight than older maintenance events. In particular, each group of incidents for each particular corrective action is identified and the average age of the group is calculated. The confidence factor for each group is adjusted by a weighting factor based on the average age of the data in the group. In the exemplary implementation, the weighting factor is determined by a Gaussian function based on the average age of the corrective actions in the group. In other implementations, a linear decline or a decay function may be applied. In still other implementations, a cut-off date may be applied in which maintenance events and corrective actions having an age less than the cut-off date are not modified and those with an average age greater than or equal to the cut-off date are ignored or have their confidence levels set to zero.

The Gaussian function produces a weighting factor that gradually decreases the relevance of data for a short time (e.g., one to two years) and decreases it more rapidly thereafter (but without reaching zero). The exemplary Gaussian function is:

$$f(x) = ae^{-\frac{(x-b)^2}{2c^2}} \quad (1)$$

where "f(x)" is the weighting factor, "x" is age in years of the corrective action(s), "a" is the maximum weight to apply, "b" is the age in years at which to apply the maximum weight, "c" controls how quickly the weight decreases as age increases, and "e" is Euler's number. In the exemplary implementation, a corrective action that is new is assigned a weight of 100%. Accordingly "a" is assigned a value of 1 and the age at which to apply the maximum (i.e., "b") is zero. This reduces equation (1) to:

$$f(x) = e^{-\frac{x^2}{2c^2}} \quad (2)$$

To determine how long it will take for the weight applied to a corrective action to approach zero as age increases, a value for "c" is determined In the exemplary implementation, a half-life for corrective actions was determined to be five years. That is, the weight applied to a corrective action reaches 0.5 when the data is five years old. In other implementations, other suitable values may be selected. For example, for a component that is frequently changed, redesigned, etc., a shorter half-life may be selected; while components that seldom change may be subjected to a greater half-life. Moreover, the half-life may be varied based on the type of vehicle. Thus, data for maritime vessels, commercial aircraft, and military vehicles may all utilize a different half-life. To determine the value for "c", a weight of 0.5 and an age of 5 years are inserted into equation (2) resulting in:

$$0.5 = e^{-\frac{5^2}{2c^2}} \quad (3)$$

Solving equation (3) for "c" yields a value of 4.24660900144. Thus, the final weighting equation is:

$$f(x) = e^{-\frac{x^2}{36.0673760222}} \quad (4)$$

Figure 3:
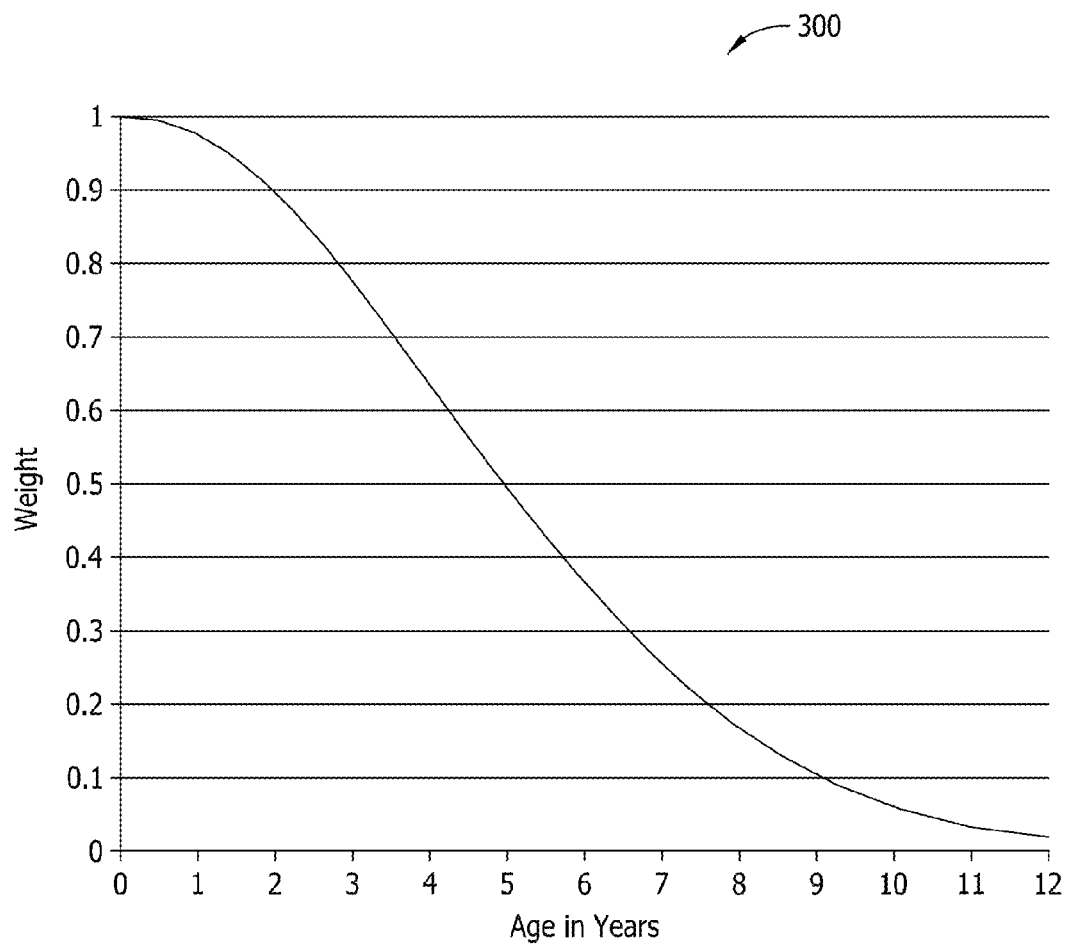
FIG. 3 is a graph of a weighting factor as a function of time for use with the system shown in FIG. 2.

FIG. 3 is a graph of the function in equation (4) as a function of age in years.

Figure 4:
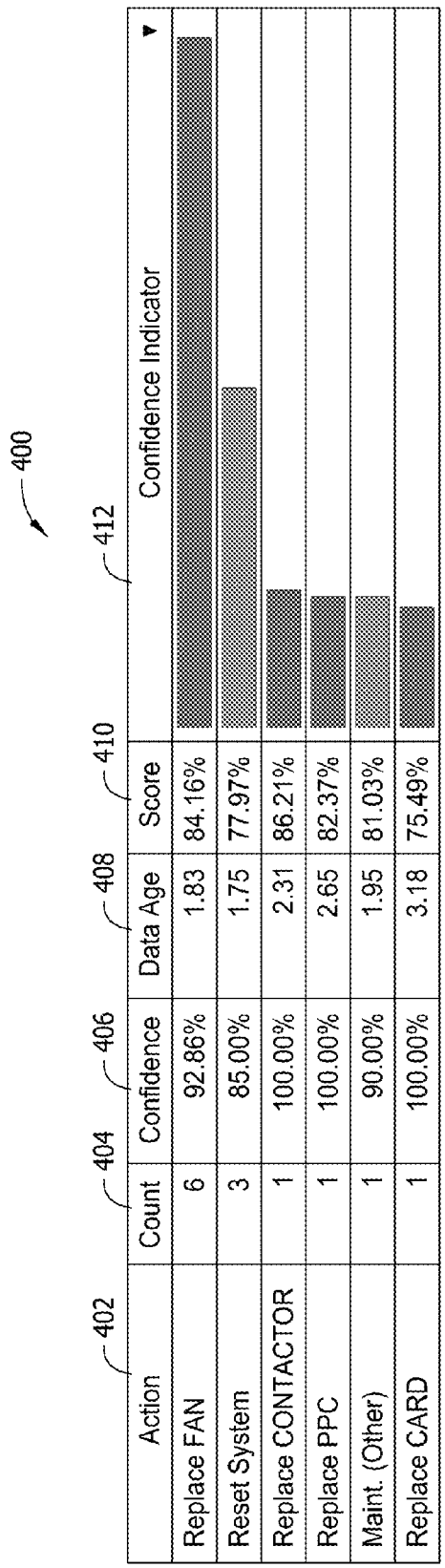
FIG. 4 is an example display of suggested corrective actions returned by the system show in FIG. 2 for a particular maintenance code.

FIG. 4 is an example display 400 of suggested corrective actions returned by system 200 for a particular maintenance code. The display 400 may be provided to user 114 of maintenance server 202, such as via presentation interface 108. In this example, six difference corrective actions are listed in a corrective action column 402. A count column 404 lists the number of times that the particular corrective action was used, and a confidence column 406 indicates the confidence that the corrective action solved the problem. The confidence column 406 indicates the unweighted confidence values for each corrective action. An age column 408 displays the average age in years for the events associated with each corrective action. A score column 410 lists the confidence factors from column 406 weighted according to equation (4). A confidence indicator column 412 graphically presents an overall confidence measurement for each of the corrective actions. In the exemplary implementation, the overall confidence measurement is the product of the weighted confidence factor from the score column 410 and the number of events (from column 404) associated with that corrective action.

It should be appreciated that one or more aspects of the present disclosure transform a general-purpose computing device into a special-purpose computing device when configured to perform the functions, methods, and/or processes described herein.

This written description uses examples to disclose various implementations, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in analyzing data related to maintenance of at least one vehicle, said method comprising:
   retrieving, by a computing device, a plurality of diagnostic entries associated with at least one fault message from a database of diagnostic entries, each diagnostic entry including an identified corrective action and a date on which the identified corrective action was taken;
   identifying a plurality of groups of diagnostic entries, wherein the diagnostic entries in a group have a same corrective action;
   weighting a confidence level associated with each group's corrective action based on an average age of the plurality of diagnostic entries in the group using a decay function;
   displaying, to a user, a plurality of suggested corrective actions to facilitate the user remedying the at least one fault message by performing at least one corrective action of the plurality of suggested corrective actions, wherein the displayed plurality of suggested corrective actions includes the corrective action with the greatest weighted confidence level.

2. The method of claim 1, wherein weighting the confidence level associated with each group's corrective action based on an average age of the plurality of diagnostic entries in the group using a decay function comprises weighting the confidence level associated with each group's corrective action based on an average age of the plurality of diagnostic entries in the group using a linear decay function.

3. The method of claim 1, wherein displaying, to the user, the plurality of suggested corrective actions comprises displaying, to the user, the plurality of suggested corrective actions and the weighted confidence level of each suggested corrective action.

4. The method of claim 1, wherein weighting the confidence level associated with each group's corrective action based on an average age of the plurality of diagnostic entries in the group using a decay function comprises weighting the confidence level associated with each group's corrective action based on an average age of the plurality of diagnostic entries in the group using a Gaussian function.

5. The method of claim 4, wherein weighting the confidence level associated with each group's corrective action based on an average age of the plurality of diagnostic entries in the group using a Gaussian function comprises weighting the confidence level associated with each group's corrective action based on an average age of the plurality of diagnostic entries in the group to produce a weighted confidence level by multiplying the confidence level for the group by a weighting factor determined for that group by $$f(x) = ae^{-\frac{(x-b)^2}{2c^2}}$$

where "f(x)" is the weighting factor, "x" is the average age, "a" is the maximum value of the weighting factor, "b" is the age in years at which to apply the maximum value of the weighting factor, "c" controls how quickly the weight decreases as age increases, and "e" is Euler's number.

6. The method of claim 5, wherein "a" has a value of 1 and "b" has a value of 0.

7. The method of claim 6, wherein "c" has a value of about 4.25.

8. The method of claim 1, further comprising determining a confidence indicator for each group's corrective action as a product of the weighted confidence level for the group's corrective action and a number of diagnostic entries in the group.

9. A maintenance system for use in analyzing data related to maintenance of at least one vehicle, said maintenance system comprising:
   a display device;
   a memory device storing a plurality of diagnostic entries, each diagnostic entry including at least one fault message, an identified corrective action, and a date; and
   a processor coupled to said memory device and said display device, said processor configured to:
      identify a plurality of groups of diagnostic entries from the plurality of diagnostic entries, wherein the diagnostic entries in a group have a same corrective action; and
      determine a weighting factor for each group of the plurality of groups based on an average age of the diagnostic entries in the group using a decay function;
      apply the weighting factor for each group to a confidence level associated with the corrective action of the group to determine a weighted confidence level for the corrective action; and
      display, on the display device, a plurality of suggested corrective actions to facilitate a user remedying the at least one fault message by performing at least one corrective action of the plurality of suggested corrective actions, wherein the displayed plurality of suggested corrective actions includes the corrective action with the greatest weighted confidence level.

10. The maintenance system of claim 9, wherein said processor is configured to determine the weighting factor for the at least one group based on an average age of the diagnostic entries in the group using a linear decay function.

11. The maintenance system of claim 9, wherein said processor is configured to display, on the display device, the weighted confidence level of each suggested corrective action.

12. The maintenance system of claim 9, wherein said processor is configured to determine the weighting factor for the at least one group based on an average age of the diagnostic entries in the group using a Gaussian function.

13. The maintenance system of claim 12, wherein said processor is configured to determine the weighting factor for each group by $$f(x) = ae^{-\frac{(x-b)^2}{2c^2}}$$

where "f(x)" is the weighting factor, "x" is the average age, "a" is the maximum value of the weighting factor, "b" is the age in years at which to apply the maximum value of the weighting factor, "c" controls how quickly the weight decreases as age increases, and "e" is Euler's number.

14. The maintenance system of claim 9, wherein the vehicle is an aircraft.

15. The maintenance system of claim 9, further comprising determining a confidence indicator for each group's corrective action as a product of the weighted confidence level for the group's corrective action and a number of diagnostic entries in the group.

16. One or more non-transitory computer-readable storage media having computer-executable instructions embodied thereon, wherein when executed by at least one processor, the computer-executable instructions cause the processor to:
    identify a plurality of groups of diagnostic entries from a plurality of diagnostic entries, wherein each diagnostic entry includes at least one fault message, an identified corrective action, and a date, and wherein the diagnostic entries in a group have a same corrective action; and
    determine a weighting factor for each group based on an average age of the plurality of diagnostic entries in the group using a decay function;
    determine a confidence level associated with the corrective action of each group of diagnostic entries;
    apply the weighting factor for each group to the confidence level associated with the corrective action of the group to determine a weighted confidence level for the corrective action; and
    display, on a display device, a plurality of suggested corrective actions to facilitate a user remedying the at least one fault message by performing at least one corrective action of the plurality of suggested corrective actions, wherein the displayed plurality of suggested corrective actions includes the corrective action with the greatest weighted confidence level.

17. The one or more non-transitory computer-readable storage media of claim 16, wherein when executed by the at least one processor, the computer-executable instructions further cause the processor to determine the weighting factor for each group based on an average age of the plurality of diagnostic entries in the group using a linear decay function.

18. The one or more non-transitory computer-readable storage media of claim 16, wherein when executed by the at least one processor, the computer-executable instructions further cause the processor to display, on the display device, the weighted confidence level of each suggested corrective action.

19. The one or more non-transitory computer-readable storage media of claim 16, wherein when executed by the at least one processor, the computer-executable instructions further cause the processor to determine the weighting factor for each group based on an average age of the plurality of diagnostic entries in the group using a Gaussian function.

20. The one or more non-transitory computer-readable storage media of claim 16, wherein when executed by the at least one processor, the computer-executable instructions further cause the processor to determine the weighting factor for each group by $$f(x) = ae^{-\frac{(x-b)^2}{2c^2}}$$

where "f(x)" is the weighting factor, "x" is the average age, "a" is the maximum value of the weighting factor, "b" is the age in years at which to apply the maximum value of the weighting factor, "c" controls how quickly the weight decreases as age increases, and "e" is Euler's number.

* * * * *